April 13, 1965 A. P. HARDISON 3,177,889
FLOAT-OPERATED SURGE RELIEF SHUTOFF VALVE
Filed Dec. 4, 1961 2 Sheets-Sheet 1

Artson P. Hardison,
INVENTOR.
WHANN & McMANIGAL
Attorneys for Applicant

April 13, 1965 A. P. HARDISON 3,177,889
FLOAT-OPERATED SURGE RELIEF SHUTOFF VALVE
Filed Dec. 4, 1961 2 Sheets-Sheet 2

Artson P. Hardison,
INVENTOR.
WHANN & McMANIGAL
Attorneys for Applicant

United States Patent Office 3,177,889
Patented Apr. 13, 1965

3,177,889
FLOAT-OPERATED SURGE RELIEF SHUTOFF VALVE
Artson P. Hardison, Glendora, Calif., assignor to Schulz Tool and Manufacturing Co., San Gabriel, Calif., a corporation of California
Filed Dec. 4, 1961, Ser. No. 156,787
4 Claims. (Cl. 137—220)

This invention relates to a fueling system shutoff valve, and more particularly to a shutoff valve having a relief means by which surge pressures in a fueling system are instantaneously dissipated.

It has been found that in certain types of aircraft, and especially those which are fueled both on the ground and in the air, surges develop during control of fueling at a very high rate. Although these surges exist for only a short period, they frequently cause bursting of various parts of the individual fueling systems.

Relief valves, according to the invention, have been installed and operated in one of a series of float-operated fuel tank shutoff valves in aircraft to eliminate any damage from surges which develop in the fuel system.

It is an object of the present invention to provide an improved float-operated shutoff valve.

It is another object of the invention to provide for an aircraft fuel system means by which surges created during close off of fueling may be instantaneously dissipated.

It is still another object of the present invention to provide a float-operated shutoff valve with a relief valve which will dissipate surges from a fuel system in which it operates when the shutoff valve is either closing or closed.

It is a further object of the present invention to provide a float-operated surge relief shutoff valve with means by which the relief valve can be made inoperative from a remote station so that the shutoff valve and system can be tested at higher pressures than at which the relief valve is set to open.

It is a still further object of the present invention to provide a fueling system having a float-operated surge relief shutoff valve.

Further objects and advantages of the invention may be brought out in the following part of the specification wherein small details have been described for the competence of disclosure, without intending to limit the scope of the invention which is set forth in the appended claims.

Referring to the accompanying drawings, which are for illustrative purposes only:

Figure 1:
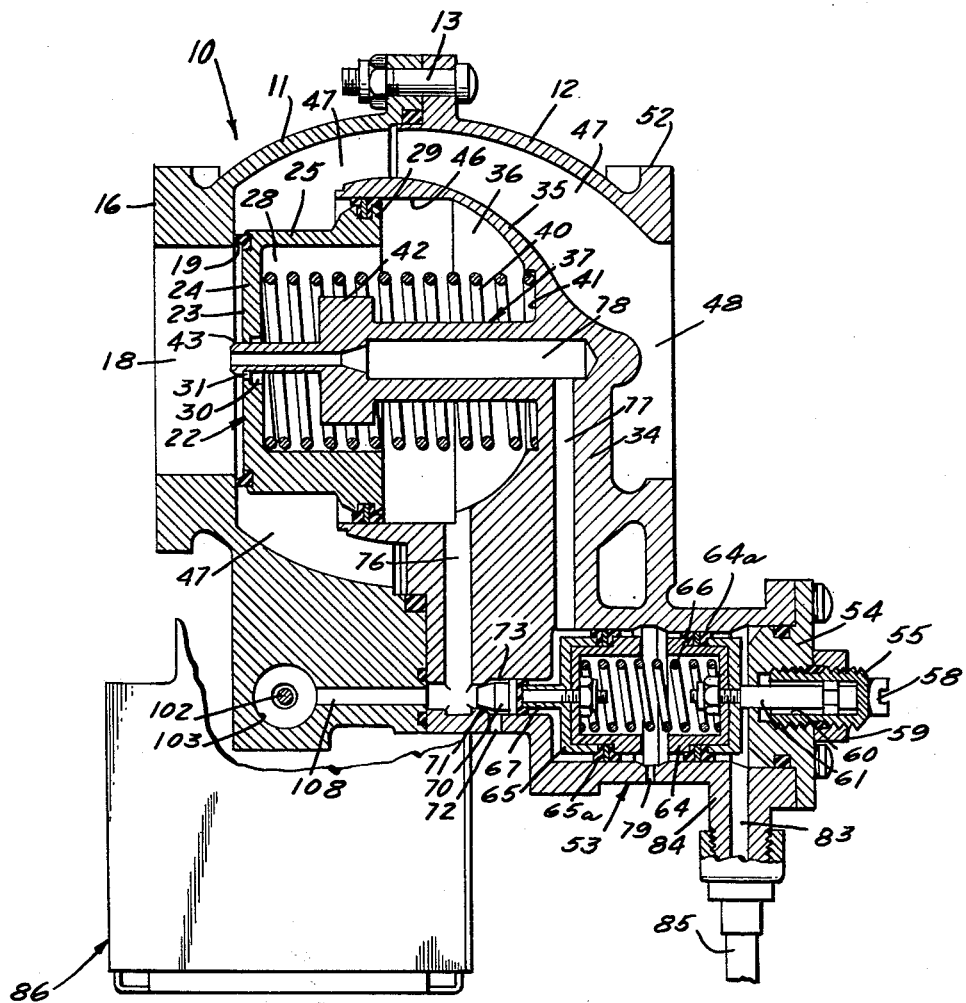
FIG. 1 is a cross sectional plan view of the valve structure according to the invention.

Referring again to the drawings, there is shown in FIG. 1 a shutoff valve having a body 10 formed of two flanged half shells 11 and 12 joined at their abutting flanges by bolts 13. At the inlet end of the body 10 is a flange 16 having bolt holes 17 for securing the body 10 to flanged tubing. An inlet opening 18 extends through the flange 16, providing a passage into the body 10.

Immediately inwardly of the inlet is a main shutoff valve seat 19 upon which a main valve 22 is normally closed and sealingly engaged. The valve 22 is in the form of a piston having an external face 23 on a substantially flat end wall 24 from which extends a cylindrical side wall 25 surrounding an internal cup portion 28. On the end of the wall 25 is an enlarged diameter portion or flange 29. Centrally within the cup 28 in the wall 24 is a counter bore 30 from which extends orifice 31, providing a passage from the inlet 18 to the interior of the cup.

Extending radially inwardly from the inner surface of the shell 12 are webs or web 34 supporting a semi-spherical wall 35 forming a chamber 36, also of generally semi-spherical configuration. Within chamber 36 extends a pin 37, surrounded by a coil spring 40 extending from the base 41 of the interior of the chamber to the inner surface of the wall 24 of the piston so as to bias the latter onto its seat 19. A large diameter portion 42 of the pin 37 serves to center the spring 40. On the outer end of the pin 37 is a small diameter portion 43 extending through and spaced from the wall of the orifice 31.

The piston or main valve 22 is thus capable of reciprocation on the pin portion 43 and its flange portion 29 is slidably and sealingly engaged with the inner cylindrical surface 46 of the chamber 36.

Surrounding the piston 22 and the chamber wall 35, extending between the webs 34, is an annular flow passage 47 terminating in valve outlet 48, through which fuel or other fluid may flow when the piston is lifted off its seat 19. The outlet 48 is formed within a flange 52, substantially identical with the flange 16.

A relief valve piston cylinder 53 is formed outwardly on the shell 12 adjacent outlet 48 in radial alignment with a web 34. Sealingly engaged and secured in the outer end of cylinder 53 is a flanged plug 54 and extending outwardly from and in threaded engagement with the latter is an adjusting plug 55 having a screw driver slot 58 in its outer end. A locking nut 59 is threadedly engaged with plug 55 in abutment with the plug 54 to hold the adjusting plug in its set position. Extending inwardly from the inner end of the plug 55 is a well 60 in which extends, slidably engaged therein, an adjusting pin 61, the outer end of pin 61 being in abutment with the base of the well 60.

On the inner end of pin 61 there is secured a cup-shaped adjusting and testing piston 64 having a seal 64a which is slidably and sealingly engaged in cylinder 53. In allochiral relationship with piston 64 is a relief valve piston 65 having a seal 65a, also slidably and sealingly engaged in the cylinder 53. The pistons 64 and 65 are spaced from each other under normal operating conditions by a coil spring 66 abutting the inner base portions of the two pistons, and the distance between the two pistons is determined by the position of the adjusting plug 55, which when rotated either moves piston 64 toward piston 65 or permits the spring 66 to move the adjusting piston outwardly away from the relief valve piston.

A relief valve connecting stem 67 extends from the closed end of the relief valve piston and has on its inner end a relief valve 70, held on its seat 71 by the force of spring 66 so as to close passage 72, extending from the relief valve chamber 73 downstream of the valve seat to the exterior of the shell 12. A passage 76 in a web 34 provides communication between the exterior of chamber 36 and the relief valve and thus, when the relief valve is open, the chamber 36 is open to the exterior of the valve body through the passage 72. Also in the web 34 is a passage 77 in communication with the interior of the cylinder 53 between the seal 65a on the relief valve piston and the relief valve, the other end of the passage 77 joining passage 78, extending through pin 37 and terminating at its outer end outwardly of the face 23 of the piston 22 so as to provide the force of the inlet pressure on the relief valve piston 65 to open the relief valve when the latter pressure is greater than the force of the spring 66.

Figure 3:
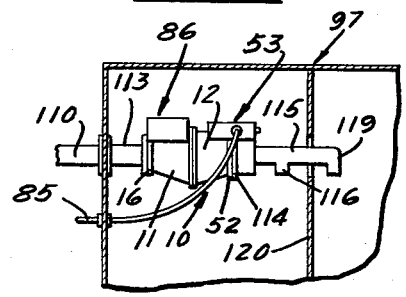
FIG. 3 is a side elevational view of the invention assembled in an aircraft fuel tank.

In order to prevent the build up of pressure between the seals on the pistons 64 and 65, an orifice 79 is provided through the wall of cylinder 53. A conduit 83 extends through boss 84 on cylinder 53, the conduit being in communication with the interior of cylinder 53 outwardly of the seal 64a on piston 64 so that when pressure is supplied through a line 85, as shown in FIG. 3, the piston 64 may be moved against the force of the spring 66 into abutment with piston 65 so as to hold the relief valve in a closed position. This permits the valve body and other parts of the system to be tested at pressures greater than that of the relief valve lifting pressure.

Figure 2:
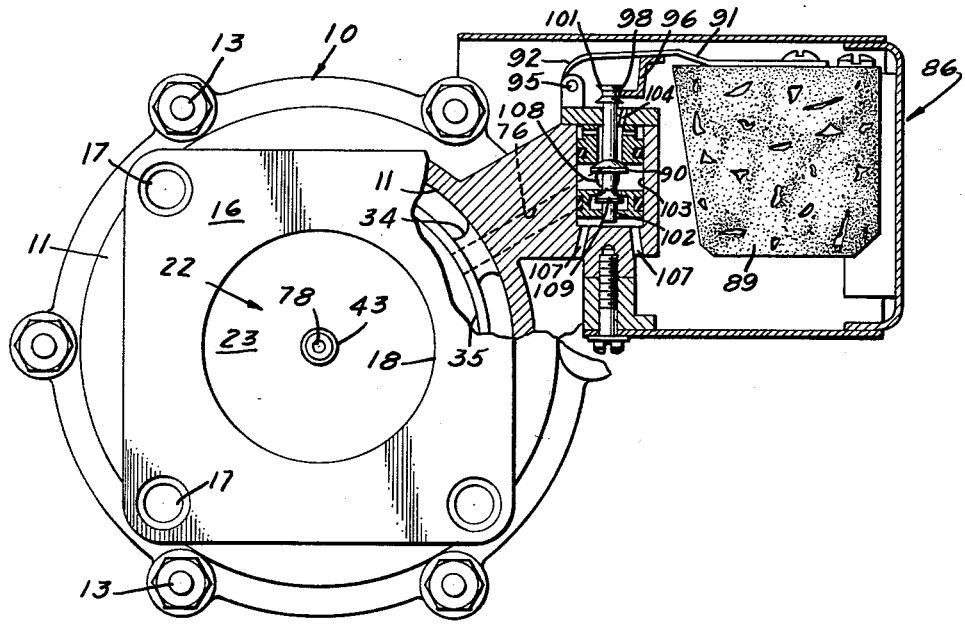
FIG. 2 is a view of the inlet end of the valve in FIG. 1, showing a float-actuated pilot valve chamber in detail.

Referring now to FIGS. 1 and 2, there is attached to the valve shell 11 a float cage 86 having therein a float 89 and a pilot valve 90.

Secured to the float is an arm 91 having its end 92 engaged to pivot on a pin 95. A lift arm 96 extends downwardly from arm 91, the arm 91 being substantially horizontal when in the up-float position, as in a tank 97 as shown in FIG. 3. The lower end 98 of arm 96 is loosely fitted between the flanges of a spool 101 on the upper end of a stem 102 of the pilot valve 90. The pilot valve 90 is balanced in its chamber 103 by orifices 104 and 107 which permit the discharge of fluid coming into chamber 103 into the cage 86 and the tank 97 when fluid flows to the valve through passage 108, joining the valve 90 with passage 76 and the interior of the chamber 36. To prevent the flow of fluid through the orifice 107 when the valve 90 is closed, an auxiliary valve 109 on the stem 102 is provided.

In FIG. 3, the valve body 10 is shown to be mounted in the tank 97 so as to provide a fueling valve for the tank which will automatically close and shut off flow to the tank when the tank is filled, as indicated by the float 89, and to provide a surge relief valve for the entire fueling system, as may be connected to fueling inlet 110 which is secured on a flange 113 to the inlet flange 16. On the other end of the valve body 10 there is a flange 114 by which a discharge line 115 is connected to the outlet 48. The discharge line 115 is shown to have two nozzles 116 and 119 separated by a tank baffle 120.

As previously indicated, the line 85 is used to supply pressure to the adjusting piston 64 to render the relief valve inoperative when the system is being tested for a pressure greater than that of the relief valve operating pressure. The line 85 is permanently installed in the tank and is connected to a pressure source, for example, an air compressor.

In operation, to fuel an aircraft either on the ground or in the air, fuel is supplied to the main valve inlet 18 through the line 110 connected to the manifold and the main valve 22 is opened by line pressure which exceeds the force of the spring 40. When the valve 22 is opened, fuel flows through the annular passage 47 into the discharge pipe 115 and out of the nozzles 116 and 119 into the tank 97. As may be seen in FIG. 1, the fuel at line pressure in the inlet 18 also is communicated to act upon the relief valve piston 65 through passages 78 and 77 and a small amount of fuel at line pressure flows through orifice 31 into the chamber 36, into passages 76, 108, and into the valve chamber 103 and out of the orifices 104 and 107 through the valve cage 86 into the tank 97.

As may be seen in FIG. 2, when the tank level is sufficient to cause the float to rise to its upper position, as shown, the lift arm 96 engages the upper flange of the spool 101 so as to close the pilot valve 90 and the lower valve 109. This stops the flow of fluid out of chamber 103, causing the fuel passages 108, 76 and the chamber 36 to be at the same pressure as that in the inlet 18. When this occurs, because of the larger diameter and area provided by the flange 29 on the piston compared to that of the external face 23, the total force on the interior of the piston and flange being greater than that on the external face, the valve 22 is caused to close and preclude further flow into the tank.

Frequently, during the closing of the valve 22, a surge develops in the line and in the valve to such an extent that if it is not instantaneously dissipated, a line or the tank may be ruptured. The surge created as the main valve 22 is being closed is caused by a dynamic quantity of fuel. With a relief valve 70 in the system, when a surge pressure develops greater than the force produced by relief valve spring 66, the pressure through passages 78 and 77 from the inlet causes the piston 65 to be moved to the right in FIG. 1 and the relief valve to be moved off of its seat to permit the discharge of fluid from the chamber 36 and out of the valve body through the passage 72. This arrangement removes the surge pressure immediately from the entire fueling system. It should be noted that such surges are of very short duration and the amount of fluid that flows through the passage 72 is small and the surge is dissipated in fractions of a second.

The relief valve, according to the present invention, need only be in one of a series of shutoff valves having a pressure-operated valve, as 22 in FIG. 1. The reason for this is that the relief valve in one of the valves senses the upstream pressure from the manifold and the entire system in that the passage 78 is in communication with the inlet 18 when the main valve is closed and, therefore, is able to communicate the pressure as it is developed in the entire system to the relief valve piston 65.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. In a valve body:
  (a) an inlet;
  (b) an outlet;
  (c) a flow passage between said inlet and outlet;
  (d) a valve seat;
  (e) a pressure responsive valve chamber;
  (f) a main piston valve sealingly engaged and slidable within said chamber and biased to be positioned on said seat to close said valve across said flow passage;
  (g) a normally closed relief valve on said body;
  (h) a relief valve piston connected to open said relief valve at a predetermined pressure;
  (i) passage means within said body to provide a total pressure pickup extending through said piston valve and said chamber to directly communicate substantial total pressure at said inlet externally of said seat when said inlet is closed and internally of said seat when said inlet is open to act upon said relief valve piston and open said relief valve at said predetermined pressure;
  (j) means within said main piston to communicate pressure adjacent said inlet to said chamber;
  (k) means connected to said body to seal said last pressure within said chamber;
  (l) means within said chamber to be acted upon by said last pressure to hold said main piston in said closed position on said seat against pressure in said inlet when said chamber is sealed;
  (m) and means within said body to connect said pressure in said chamber to said relief valve so that when said relief valve is opened said chamber pressure is released, seal means between said relief valve and said relief valve piston, said passage means being independent of the pressure within said chamber.

2. In a liquid level control valve having surge relief means:
  (a) a valve body;
  (b) an inlet into said body;
  (c) an outlet from said body;
  (d) an annular flow passage through said body connecting said inlet and said outlet;
  (e) a valve seat in said body adjacent said inlet and positioned so that flow through said inlet passes over said seat;
(f) a valve chamber within said body the exterior of which substantially forms the inner surfaces of said annular flow passage;
(g) a main piston valve sealingly and slidably engaged within said chamber and spring biased to be positioned on said seat to close said valve across said flow passage and said inlet;
(h) a normally closed relief valve in said body;
(i) a relief valve piston in said body connected to said relief valve to open said relief valve at a predetermined pressure;
(j) a passage within said body extending through said main piston valve and into said chamber to communicate pressure externally of said seat when said inlet is closed and internally of said seat when said inlet is open to act upon said relief valve piston and open said relief valve at a predetermined pressure,
(k) said passage being centrally within said main piston valve and centrally within said inlet to receive the total pressure of flow through the inlet and to said passage;
(l) an opening in said main piston to communicate pressure in said inlet to said chamber;
(m) a second passage from said chamber to the exterior of said body;
(n) a float-actuated pilot valve to close said second passage and to seal said pressure within said chamber; and
(o) means within said chamber to be acted upon by said pressure to hold said main piston in said closed position on said seat against said pressure in said inlet when said chamber is sealed and when said pressure is greater than the force of said spring,
(p) said relief valve being in a third passage in communication with said second passage, said third passage being open to the exterior of said body so that when said relief valve is open said chamber pressure is released.

3. The invention according to claim 2 including means to apply pressure to said relief valve to make it inoperative so that said valve body and internal structures can be structurally tested at a pressure higher than said predetermined pressure.

4. In a liquid flow valve:
(a) a valve body;
(b) an inlet in said body;
(c) an outlet in said body;
(d) a flow passage in said body between said inlet and outlet;
(e) a valve seat in said body;
(f) a valve chamber in said body;
(g) a main piston valve sealingly engaged and slidable within said chamber and spring biased to be positioned on said seat to close said valve across said flow passage;
(h) a normally closed relief valve within said body;
(i) a relief valve piston in said body connected to said relief valve to open said relief valve at a predetermined pressure;
(j) means within said body to provide a total pressure pickup extending through said piston valve and said chamber to directly communicate substantial total pressure externally of said seat when said inlet is closed and internally of said seat when said inlet is open to act upon said relief valve piston and open said relief valve at said predetermined pressure;
(k) an opening in said main piston to communicate pressure adjacent said inlet to said chamber;
(l) a passage from said chamber to the exterior of said body;
(m) means to close said passage and to seal said last pressure within said chamber;
(n) means within said chamber to be acted upon by said last pressure to hold said main piston in said closed position on said seat against said pressure in said inlet when said chamber is sealed and when said inlet pressure is greater than the force of said spring;
(o) said relief valve being in a second passage communicating said chamber to the exterior of said body so that when said relief valve is opened said chamber pressure is released;
(p) and means to apply pressure to said relief valve to make it inoperative so that said relief valve can be structurally tested at a pressure higher than said predetermined pressure.

References Cited by the Examiner
UNITED STATES PATENTS

| | | | |
|---|---|---|---|
| 2,091,596 | 8/37 | Kluppel | 137—491 |
| 2,842,157 | 7/58 | Mosher | 137—413 XR |
| 2,888,030 | 5/59 | McQueen | 137—413 XR |
| 2,923,314 | 2/60 | Badger | 251—26 XR |
| 2,944,564 | 7/60 | Pettey | 137—529 |

M. CARY NELSON, *Primary Examiner.*

ISADOR WEIL, *Examiner.*